United States Patent
Chu et al.

(10) Patent No.: US 10,553,865 B2
(45) Date of Patent: Feb. 4, 2020

(54) NEGATIVE ACTIVE MATERIAL AND NEGATIVE ELECTRODE AND LITHIUM BATTERY INCLUDING THE MATERIAL

(71) Applicant: Samsung SDI Co., Ltd., Yongin-si, Gyeonggi-do (KR)

(72) Inventors: Heeyoung Chu, Yongin-si (KR); Jaehyuk Kim, Yongin-si (KR); Soonsung Suh, Yongin-si (KR); Hana Yoo, Yongin-si (KR); Seunguk Kwon, Yongin-si (KR); Dukhyoung Yoon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 15/227,366

(22) Filed: Aug. 3, 2016

(65) Prior Publication Data

US 2017/0098825 A1    Apr. 6, 2017

(30) Foreign Application Priority Data

Oct. 2, 2015   (KR) .................. 10-2015-0139110

(51) Int. Cl.
*H01M 4/38*     (2006.01)
*H01M 10/0525*  (2010.01)
(Continued)

(52) U.S. Cl.
CPC ........... *H01M 4/386* (2013.01); *H01M 2/162* (2013.01); *H01M 2/1653* (2013.01);
(Continued)

(58) Field of Classification Search
CPC ......... H01M 10/0525; H01M 10/0568; H01M 10/0569; H01M 2004/021;
(Continued)

(56) References Cited

U.S. PATENT DOCUMENTS 6,265,111 B1   7/2001   Bito et al.
9,142,858 B2   9/2015   Nakanishi et al.
(Continued)

FOREIGN PATENT DOCUMENTS

JP   2004-185991    *  7/2004  .............. H01M 4/58
JP   2004-185991 A     7/2004
(Continued)

OTHER PUBLICATIONS

Machine translation of JP2004-185991 (Year: 2004).*
(Continued)

*Primary Examiner* — Lisa S Park
(74) *Attorney, Agent, or Firm* — Lewis Roca Rothgerber Christie LLP (57) ABSTRACT

A negative active material includes a silicon-based alloy, and the silicon-based alloy includes a Si single phase, a $FeSi_2$ alpha phase, and a $FeSi_2$ beta phase, wherein an intensity ratio of a second diffraction peak of the $FeSi_2$ beta phase to a first diffraction peak of the $FeSi_2$ alpha phase may be 0.1 or higher. A negative electrode includes the negative active material and a lithium battery includes the negative electrode. Lifespan characteristics of the lithium battery including the negative active material may improve.

15 Claims, 8 Drawing Sheets

(51) Int. Cl.
*H01M 10/0568* (2010.01)
*H01M 2/16* (2006.01)
*H01M 4/04* (2006.01)
*H01M 4/131* (2010.01)
*H01M 4/134* (2010.01)
*H01M 4/505* (2010.01)
*H01M 4/525* (2010.01)
*H01M 4/62* (2006.01)
*H01M 4/66* (2006.01)
*H01M 4/1395* (2010.01)
*H01M 10/0569* (2010.01)
*H01M 4/02* (2006.01)

(52) U.S. Cl.
CPC ......... *H01M 4/043* (2013.01); *H01M 4/0404* (2013.01); *H01M 4/0471* (2013.01); *H01M 4/131* (2013.01); *H01M 4/134* (2013.01); *H01M 4/1395* (2013.01); *H01M 4/505* (2013.01); *H01M 4/525* (2013.01); *H01M 4/622* (2013.01); *H01M 4/623* (2013.01); *H01M 4/625* (2013.01); *H01M 4/661* (2013.01); *H01M 10/0525* (2013.01); *H01M 10/0568* (2013.01); *H01M 10/0569* (2013.01); *H01M 2004/021* (2013.01); *H01M 2004/027* (2013.01); *H01M 2004/028* (2013.01); *H01M 2220/20* (2013.01); *H01M 2220/30* (2013.01); *H01M 2300/004* (2013.01); *H01M 2300/0034* (2013.01)

(58) Field of Classification Search
CPC ..... H01M 2004/027; H01M 2004/028; H01M 2220/20; H01M 2220/30; H01M 2300/0034; H01M 2300/004; H01M 2/162; H01M 2/1653; H01M 4/0404; H01M 4/043; H01M 4/0471; H01M 4/131; H01M 4/134; H01M 4/1395; H01M 4/386; H01M 4/505; H01M 4/525; H01M 4/622; H01M 4/623; H01M 4/625; H01M 4/661; H01M 4/364; H01M 2204/021; C01B 33/00; C22C 1/02

See application file for complete search history.

(56) References Cited

U.S. PATENT DOCUMENTS

| | | |
|---|---|---|
| 2010/0288982 A1 | 11/2010 | Le et al. |
| 2011/0215280 A1* | 9/2011 | Obrovac ............... H01M 4/38 252/516 |
| 2013/0196233 A1 | 8/2013 | Moon et al. |
| 2013/0316238 A1 | 11/2013 | Nishimura et al. |
| 2014/0291574 A1* | 10/2014 | Hong ................... H01M 4/134 252/182.1 |

FOREIGN PATENT DOCUMENTS

| | | |
|---|---|---|
| JP | 2009-46381 A | 3/2009 |
| KR | 10-0570618 B1 | 4/2006 |
| KR | 10-0637488 B1 | 10/2006 |
| KR | 10-2012-0010211 A | 2/2012 |
| KR | 10-2013-0089569 A | 8/2013 |

OTHER PUBLICATIONS

Li, "Synthesis of B-FeSi$_2$ with Co or Cu addition by molten salt method," Graduate School of Science and Technology, Shizuoka University, 3 pages.

EPO Extended Search Report dated Mar. 1, 2017, for corresponding European Patent Application No. 16191463.5 (8 pages).

* cited by examiner

NEGATIVE ACTIVE MATERIAL AND NEGATIVE ELECTRODE AND LITHIUM BATTERY INCLUDING THE MATERIAL

CROSS-REFERENCE TO RELATED APPLICATION

This application claims the benefit of Korean Patent Application No. 10-2015-0139110, filed on Oct. 2, 2015, in the Korean Intellectual Property Office, the entire content of which is incorporated herein by reference.

BACKGROUND

1. Field

One or more exemplary embodiments relate to a negative active material, a negative electrode including the negative active material, and a lithium battery including the negative electrode.

2. Description of the Related Art

Lithium secondary batteries used in portable electronic devices, such as mobile phones, personal digital assistants (PDAs), laptop computers, electric bicycles, or electric vehicles have discharge voltages twice that of non-lithium batteries. Thus, lithium secondary batteries have high energy density.

Lithium secondary batteries are reusable batteries that may be repeatedly charged and discharged which generate electrical energy by oxidation and reduction reactions during intercalation/deintercalation of lithium ions at positive and negative electrodes while an organic electrolyte solution or a polymer electrolyte solution including an active material capable of intercalating and deintercalating lithium ions is filled between the positive electrode and the negative electrode.

The lithium secondary battery has excellent battery properties including a high electromotive force and a high energy density, but a battery having long lifespan characteristics is needed as industries develop, and thus studies in this regard have been conducted.

SUMMARY

One or more exemplary embodiments include a negative active material including a silicon-based alloy having a stable matrix phase by including a $FeSi_2$ beta phase.

One or more exemplary embodiments include a negative electrode including the negative active material.

One or more exemplary embodiments include a lithium battery having improved lifespan characteristics by including the negative electrode.

Additional aspects of embodiments will be set forth in part in the description which follows and, in part, will be apparent from the description, or may be learned by practice of the presented embodiments.

According to one or more exemplary embodiments, a negative active material includes a silicon-based alloy, wherein the silicon-based alloy is represented by Si—Fe—$M_1$, $M_1$ is at least one selected from lithium (Li), magnesium (Mg), calcium (Ca), titanium (Ti), vanadium (V), chromium (Cr), manganese (Mn), cobalt (Co), nickel (Ni), copper (Cu), zinc (Zn), yttrium (Y), zirconium (Zr), molybdenum (Mo), indium (In), tin (Sn), boron (B), carbon (C), oxygen (O), and phosphorous (P), the silicon-based alloy includes a Si single phase, a $FeSi_2$ alpha phase, and a $FeSi_2$ beta phase, a Cu—Kα X-ray diffraction analysis spectrum of the negative active material has a first diffraction peak generated by the $FeSi_2$ alpha phase at a diffraction angle 2θ of about 17.0°+/−0.5° and a second diffraction peak generated by the $FeSi_2$ beta phase at a diffraction angle 2θ of about 28.7°+/−0.5°, and an intensity ratio of the second diffraction peak, generated by the $FeSi_2$ beta phase, to the first diffraction peak, generated by the $FeSi_2$ alpha phase, is 0.1 or higher.

According to one or more exemplary embodiments, a negative electrode for a lithium battery includes the negative active material.

According to one or more exemplary embodiments, a lithium battery includes the negative electrode.

BRIEF DESCRIPTION OF THE DRAWINGS

These and/or other aspects of embodiments will become apparent and more readily appreciated from the following description of the exemplary embodiments, taken in conjunction with the accompanying drawings in which.

DETAILED DESCRIPTION

Reference will now be made in more detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of embodiments of the present description. As used herein, the term "and/or" includes any and all combinations of one or more of the associated listed items. Expressions such as "at least one of," when preceding a list of elements, modify the entire list of elements and do not modify the individual elements of the list.

As used herein, "atomic percent (at %)" refers to a percent of the number of atoms of the corresponding component in the total number of atoms of the whole material.

As a negative active material of a lithium battery, a silicon-based alloy may be used as well as various suitable types (or kinds) of carbonaceous materials. Here, the term "silicon-based" alloy refers to an alloy that includes silicon (Si) at about 50 at % or more based on the total number of atoms. When the negative active material includes the silicon-based alloy, a battery may have a high capacity compared to a carbonaceous negative active material.

The silicon-based alloy for a negative active material is mostly prepared by using a melt spin process in order to limit or reduce crystal growth of silicon and evenly precipitate silicon in a matrix material. In the middle of the silicon-based alloy thus prepared, silicon particles are precipitated in a matrix structure, and a silicon alloy-based matrix surrounding silicon serves as a buffer layer to endure or reduce a volume change of silicon during charging/discharging of the battery. Here, an alloy phase that serve as a matrix in general is inert to an electrochemical reaction in the battery, and the silicon particles precipitated in the matrix may be active to an electrochemical reaction in the battery. Here, the term "inert" may refers to not participating intercalation/deintercalation of lithium ions during a charging/discharging process, and the term "active" refers to participating intercalation/deintercalation of lithium ions during a charging/discharging process. However, volumes of the active silicon particles significantly change during a charging/discharging process, and thus an active material including the silicon-based alloy may be broken after several charging/discharging process or a conducting path between the active materials may be disconnected (e.g., decoupled). Due to such problems, cycle lifespan characteristics of the battery may deteriorate.

Accordingly, in order to improve the cycle lifespan characteristics, the present inventors introduced a $FeSi_2$ beta phase as a matrix of a silicon-based alloy to minimize or reduce a volume change of silicon particles even after repeated charging/discharging of a battery, and thus lifespan characteristics of a lithium battery including the silicon-based alloy as an active material may improve.

The negative active material according to an exemplary embodiment includes a silicon-based alloy, and the silicon-based alloy is represented by $Si-Fe-M_1$.

$M_1$ is at least one selected from lithium (Li), magnesium (Mg), calcium (Ca), titanium (Ti), vanadium (V), chrome or chromium (Cr), manganese (Mn), cobalt (Co), nickel (Ni), copper (Cu), zinc (Zn), yttrium (Y), zirconium (Zr), molybdenum (Mo), indium (In), tin (Sn), boron (B), carbon (C), oxygen (O), and phosphorus (P).

The silicon-based alloy includes a Si single phase (e.g., a phase that includes Si and is substantially or completely free of Fe and $M_1$), a $FeSi_2$ alpha phase, and a $FeSi_2$ beta phase as alloy phases. For example, the Si single phase in the silicon-based alloy may be dispersed between the $FeSi_2$ alpha phase and the $FeSi_2$ beta phase. For example, in the silicon-based alloy, the $FeSi_2$ alpha phase and the $FeSi_2$ beta phase form an interface with the Si single phase and may serve as a matrix that surrounds the Si single phase.

For example, in the silicon-based alloy, the Si single phase may include Si active nanoparticles. Thus, the Si single phase is capable of intercalating/deintercalating lithium ions during a charging/discharging process of a lithium battery.

Figure 1:
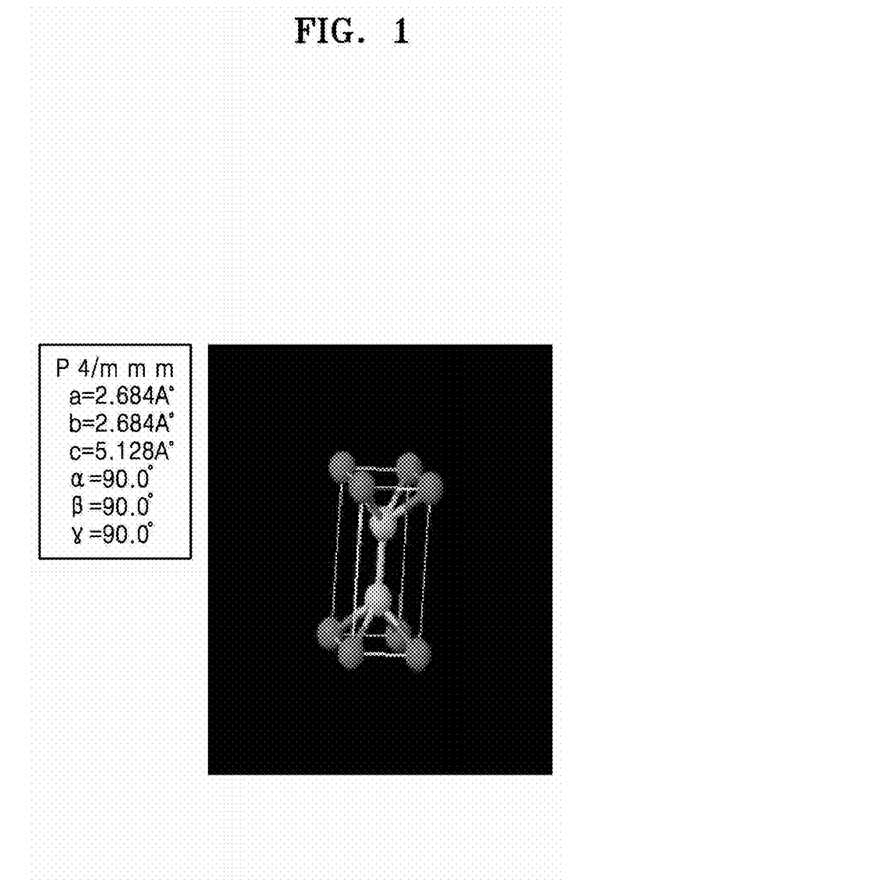
FIG. 1 is a perspective view illustrating a crystalline structure of a $FeSi_2$ alpha phase.
Figure 2:
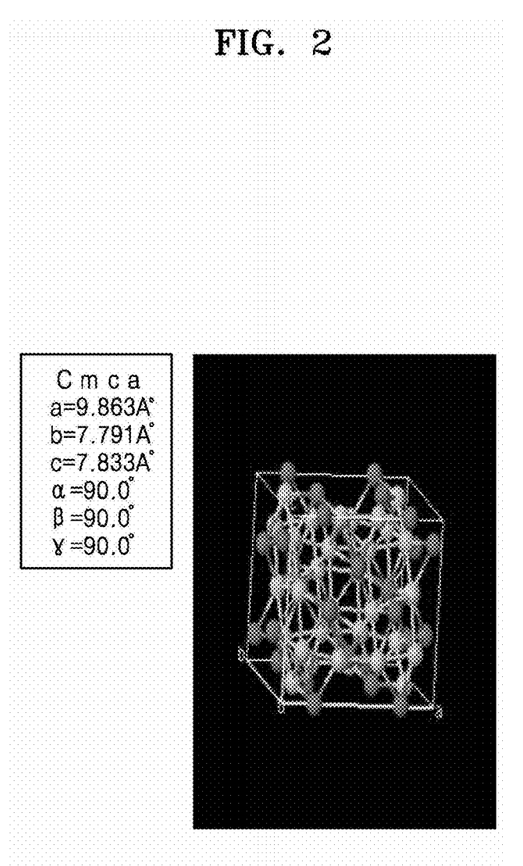
FIG. 2 is a perspective view illustrating a crystalline structure of a $FeSi_2$ beta phase.

For example, crystalline structures of the $FeSi_2$ alpha phase and the $FeSi_2$ beta phase are shown in FIGS. 1 and 2, respectively.

The $FeSi_2$ alpha phase has a tetragonal crystalline structure as shown in FIG. 1. Whereas, the $FeSi_2$ beta phase has an orthorhombic crystalline structure as shown in FIG. 2. The crystalline structures may be confirmed by using jems (Pierre Stadelmann, CIME-EPFL Station 12, CH-1015 Lausanne, Switzerland) capable of simulating a diffraction pattern.

In general, when the silicon-based alloy is prepared by using Si and Fe, the Si single phase and the $FeSi_2$ alpha phase are the phases that are generally prepared. The $FeSi_2$ alpha phase having a tetragonal crystalline structure as shown in FIG. 1 is an inert phase and an unstable phase that may be phase-converted during repeated charging/discharging of a lithium battery. On the other hand, the $FeSi_2$ beta phase having an orthorhombic crystalline structure as shown in FIG. 2 is an inert phase and maintains a stable state that does not undergo phase conversion during repeated charging/discharging of a lithium battery. Therefore, when the $FeSi_2$ beta phase is included in the silicon-based alloy as a matrix as well as the $FeSi_2$ alpha phase, volume change of Si active nanoparticles may be effectively controlled even when the lithium battery is repeatedly charged/discharged.

Figure 3:
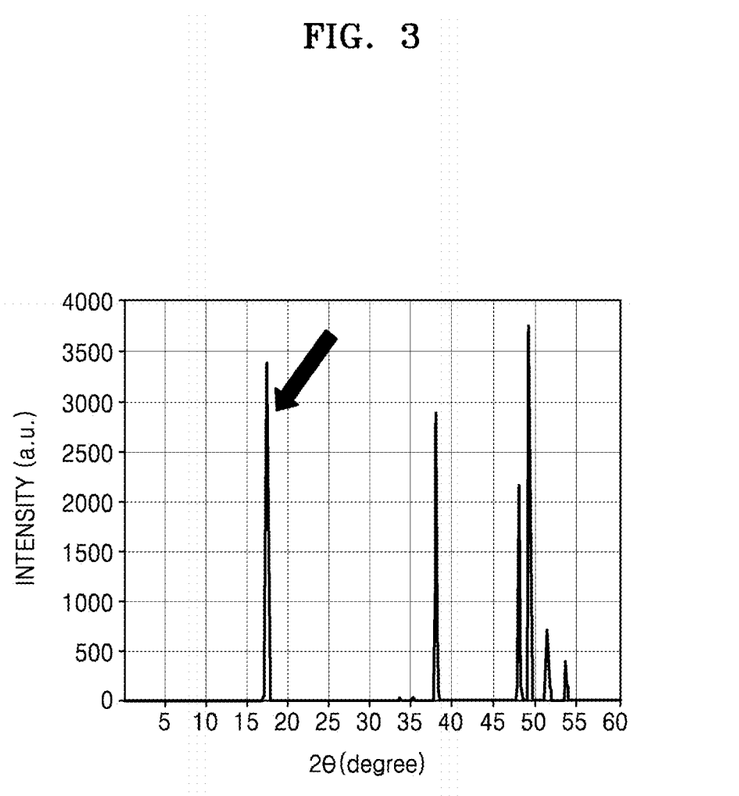
FIG. 3 is graph illustrating an X-ray diffraction analysis (using Cu—Kα of 1.5406 Å) spectrum of a $FeSi_2$ alpha phase.
Figure 4:
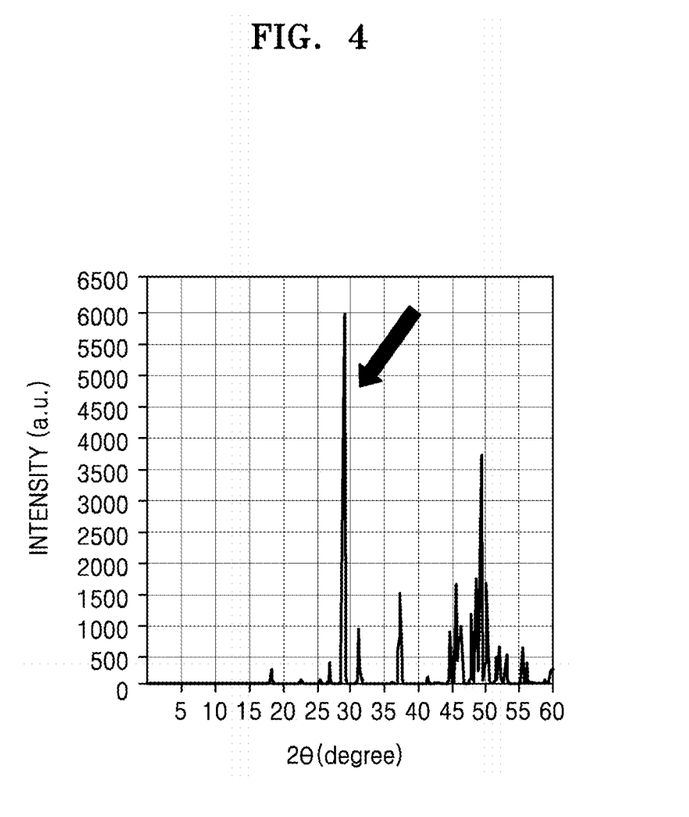
FIG. 4 is a graph illustrating an X-ray diffraction analysis (using Cu—Kα of 1.5406 Å) spectrum of a $FeSi_2$ beta phase.

FIGS. 3 and 4 show a Cu—Kα X-ray diffraction analysis (e.g., an X-ray diffraction analysis using Cu—Kα of 1.5406 Å) spectra of the $FeSi_2$ alpha phase and the $FeSi_2$ beta phase, respectively.

As shown in FIG. 3, the $FeSi_2$ alpha phase shows a main diffraction peak within (e.g., at) a diffraction angle 2θ of about 17.0+/−0.5° as indicated by an arrow from the X-ray diffraction analysis (using Cu—Kα of 1.5406 Å).

On the other hand, as shown in FIG. 4, the $FeSi_2$ beta phase shows a main diffraction peak within (e.g., at) a diffraction angle 2θ of about 28.7+/−0.5° as indicated by an arrow from the X-ray diffraction analysis (using Cu—Kα of 1.5406 Å).

Thus, the X-ray diffraction analysis spectrum using Cu—Kα of 1.5406 Å with respect to the negative active material including the silicon-based alloy includes both the diffraction peak generated by the $FeSi_2$ alpha phase and the diffraction peak generated by the $FeSi_2$ beta phase, where an intensity ratio of the diffraction peak within (e.g., at) a diffraction angle 2θ of about 28.7+/−0.5° generated by the $FeSi_2$ beta phase (also, referred to as "first peak" or a "first diffraction peak") to the diffraction peak within (e.g., at) a diffraction angle 2θ of about 17.0+/−0.5° generated by the $FeSi_2$ alpha phase (also, referred to as "second peak" or a "second diffraction peak") is about 0.1 or higher.

Here, the intensity ratio of the diffraction peaks may be obtained by making a vertical line perpendicular to a horizontal line in each of the first peak and the second peak, measuring a height of the vertical line, and dividing a height of the second peak by a height of the first peak. Therefore, a high intensity ratio of the second peak to the first peak denotes that a large amount of the $FeSi_2$ beta phase is produced in the silicon-based alloy. When the intensity ratio of the second peak to the first peak is about 1.0 or higher, an amount of the $FeSi_2$ beta phase is greater than an amount of the $FeSi_2$ alpha phase in the silicon-based alloy.

For example, an intensity ratio of the second peak to the first peak may be in a range of about 0.2 to about 3.0. For example, an intensity ratio of the second peak to the first peak may be in a range of about 0.2 to about 2.0. For example, an intensity ratio of the second peak to the first peak may be in a range of about 0.2 to about 1.0. For example, an intensity ratio of the second peak to the first peak may be in a range of about 0.2 to about 0.5. When the intensity ratio of the second peak to the first peak is within these ranges, the silicon-based alloy may include the $FeSi_2$ beta phase, which is stable at room temperature, as an inert matrix, in addition to the $FeSi_2$ alpha phase, and thus lifespan characteristics of a lithium battery including the silicon-based alloy as a negative active material may improve.

In the silicon-based alloy, $M_1$ may be doped into a crystal lattice of at least one selected from the Si single phase, the $FeSi_2$ alpha phase, and the $FeSi_2$ beta phase. For example, $M_1$ does not form another compound with Si or Fe but may exist as an element substituting Fe or Si site in a crystal lattice of the Si single phase, the $FeSi_2$ alpha phase, or the $FeSi_2$ beta phase. In this regard, when $M_1$ is doped into the Si—Fe alloy, the $FeSi_2$ beta phase may be effectively formed without a separate process such as additional heat-treating or milling for a long period of time. Whether $M_1$ formed another compound with Si or Fe in the silicon-based alloy or not may be confirmed by observing whether a diffraction peak generated by an $M_1$-Si or $M_1$-Fe alloy phase appeared in the X-ray diffraction analysis performed on the silicon-based alloy.

For example, the silicon-based alloy may not include an $M_1$-containing silicide. Thus, no or substantially no other phase than the $FeSi_2$ alpha phase and the $FeSi_2$ beta phase exists in the matrix of the silicon-based alloy, and thus the matrix may be maintained stable during charging/discharging of the battery.

In some embodiments, $M_1$ may be selected from titanium (Ti), vanadium (V), chrome or chromium (Cr), manganese (Mn), cobalt (Co), nickel (Ni), copper (Cu), and zinc (Zn), but embodiments are not limited thereto. For example, $M_1$ may be Mn. When $M_1$ is a transition metal in period 4, $M_1$ may be doped into the Si—Fe alloy and thus may not form a separate compound with Si or Fe.

In some embodiments, in the silicon-based alloy, an amount of Si is in a range of about 67 at % to about 92 at %, an amount of Fe is in a range of about 4 at % to about 32 at %, and an amount of $M_1$ is in a range of about 0.3 at % to about 6.0 at % based on the total number of Si, Fe, and $M_1$ atoms. For example, in the silicon-based alloy, when the amount of Si is 67 at % or higher, the $FeSi_2$ beta phase may start to be formed. Also, in the silicon-based alloy, when an amount of $M_1$ is within this range above, $M_1$ does not form a separate compound with Si or Fe and may be doped into a crystal lattice of the Si single phase, the $FeSi_2$ alpha phase, or the $FeSi_2$ beta phase to contribute in the formation of the $FeSi_2$ beta phase.

For example, in the silicon-based alloy, an amount of Si is in a range of about 75 at % to about 90 at %, an amount of Fe is in a range of about 9 at % to about 22 at %, and an amount of $M_1$ is in a range of about 0.3 at % to about 6.0 at % based on the total number of Si, Fe, and $M_1$ atoms.

For example, in the silicon-based alloy, an amount of Si is in a range of about 75 at % to about 90 at %, an amount of Fe is in a range of about 9 at % to about 22 at %, and an amount of $M_1$ is in a range of about 0.5 at % to about 3.0 at % based on the total number of Si, Fe, and $M_1$ atoms.

For example, in the silicon-based alloy, an amount of Si is in a range of about 77 at % to about 83 at %, an amount of Fe is in a range of about 15 at % to about 20 at %, and an amount of $M_1$ is in a range of about 1.0 at % to about 3.0 at % based on the total number of Si, Fe, and $M_1$ atoms, but embodiments are not limited thereto.

In some embodiments, the silicon-based alloy may be represented by Si—Fe—Mn, and, in the silicon-based alloy, an amount of Si is in a range of about 75 at % to about 90 at %, an amount of Fe is in a range of about 9 at % to about 22 at %, and an amount of Mn is in a range of about 0.3 at % to about 6.0 at % based on the total number of Si, Fe, and Mn atoms.

For example, in the silicon-based alloy, an amount of Si is in a range of about 75 at % to about 90 at %, an amount of Fe is in a range of about 9 at % to about 22 at %, and an amount of Mn is in a range of about 0.5 at % to about 3.0 at % based on the total number of Si, Fe, and Mn atoms, but embodiments are not limited thereto.

For example, in the silicon-based alloy, an amount of Si is in a range of about 77 at % to about 83 at %, an amount of Fe is in a range of about 15 at % to about 20 at %, and an amount of Mn is in a range of about 1.0 at % to about 3.0 at % based on the total number of Si, Fe, and Mn atoms, but embodiments are not limited thereto.

For example, the silicon-based alloy may include $Si_{80}Fe_{18}Mn_2$, $Si_{80.2}Fe_{17.9}Mn_{1.9}$, $Si_{83.9}Fe_{13.5}Mn_{2.9}$, $Si_{87.5}Fe_{10.9}Mn_{1.6}$, and/or $Si_{78.3}Fe_{21.1}Mn_{0.6}$.

The silicon-based alloy represented by Si—Fe—Mn may not include an Mn-containing silicide. For example, the silicon-based alloy represented by Si—Fe—Mn may not include $MnSi_{1.7}$.

In some embodiments, an average particle diameter (D50) of the silicon-based alloy may be in a range of about 1 μm to about 5 μm. For example, an average particle diameter (D50) of the silicon-based alloy may be in a range of about 1 μm to about 3 μm. For example, an average particle diameter (D50) of the silicon-based alloy may be in a range of about 2 μm to about 3 μm.

As used herein, the average particle diameter (D50) denotes a cumulative average particle diameter that corresponds to 50 vol % in a cumulative distribution curve of a particle diameter having the total volume as 100%. The average particle diameter (D50) may be measured by using any suitable method available in the art. An example of the method may include measuring by a particle size analyzer or measuring from a transmission electron microscopy (TEM) or scanning electron microscopy (SEM) image. In some embodiments, the method may include measuring with a meter by dynamic light-scattering, performing data analysis to count the number of particles with respect to each of size ranges, and thus D50 may be easily obtained from the resulting calculation.

In some embodiments, an average particle diameter (D50) of the Si active nanoparticles may be in a range of about 10 nm to about 150 nm. For example, an average particle diameter (D50) of the Si active nanoparticles may be in a range of about 10 nm to about 100 nm or about 10 nm to about 50 nm.

When the Si active nanoparticles having an average particle diameter within this range are evenly distributed in the inert matrix, volume expansion of the Si active nanoparticles during a charging/discharging cycle may be efficiently buffered by the inert matrix that surrounds the Si active nanoparticles.

An average particle diameter (D50) of the Si active nanoparticles may be obtained by using Scherrer's equation with a full width at half maximum (FWHM) of a peak with respect to a crystal face (111) within (e.g., at) a diffraction angle 2θ of about 28.7+/−0.5° from an X-ray diffraction spectrum using CuKα of the Si single phase.

However, when the Si single phase is an amorphous phase, a peak with respect to a crystal face (111) within (e.g., at) a diffraction angle 2θ of about 28.5+/−0.5° from an X-ray diffraction spectrum using CuKα may not appear.

The negative active material may include the silicon-based alloy as a substantial (or an essential) component and may further include negative active materials that are generally used in the preparation of a lithium battery in addition to the substantial (or the essential) component.

Examples of the negative active materials may include graphite capable of intercalation and deintercalation of lithium ions, a carbonaceous material such as carbon, a lithium metal or its alloy, a silicon oxide-based material, and a mixture thereof.

In some embodiments, a silicon-based alloy and a carbonaceous material may be used as the negative active material, and the carbonaceous material may be, for example, natural graphite, artificial graphite, expanded graphite, graphene, carbon black, fullerene soot, carbon nanotubes, carbon fibers, soft carbon, hard carbon, pitch carbide, mesophase pitch carbide, sintered cokes, or a combination of at least two selected therefrom. As used herein, the terms "combination thereof" and "combinations thereof" may refer to a chemical combination (e.g., an alloy or chemical compound), a mixture, or a laminated structure of components.

When the carbonaceous material is used together with the silicon-based alloy as the negative active material, oxidation of the silicon-based alloy may be suppressed or reduced, and a solid electrolyte interphase (SEI) layer may be effectively formed, which may improve electrical conductivity of the carbonaceous material. Thus, charging/discharging characteristics of lithium may improve.

When the carbonaceous material is used, for example, the carbonaceous material may be blended while being mixed with the silicon-based alloy or may be used as coated on a surface of the silicon-based alloy.

An amount of the negative active material that is used together with the silicon-based alloy may be in a range of about 1 wt % to about 99 wt % based on the total amount of the silicon-based alloy and the negative active material.

When the silicon-based alloy is a major component in the negative active material, an amount of the silicon-based alloy may be in a range of about 90 wt % to about 99 wt % based on the total amount of the negative active material and the silicon-based alloy. When graphite or pitch, which is amorphous carbon, is used as the negative active material, the graphite or pitch, which is amorphous carbon, may be coated on a surface of the silicon-based alloy.

When the silicon-based alloy is a minor component in the negative active material, an amount of the silicon-based alloy may be, for example, in a range of about 1 wt % to about 10 wt % based on the total amount of the negative active material and the silicon-based alloy. When graphite or pitch, which is amorphous carbon, is used as the negative active material, the graphite or pitch, which is amorphous carbon, may serve as a buffer as the silicon-based alloy, and thus lifespan of the battery may increase.

Hereinafter, an embodiment of a method of preparing a negative active material including the silicon-based alloy will be described in more detail.

According to an aspect of an exemplary embodiment, a method of preparing the negative active material includes preparing a mother alloy having a composition including about 67 at % to about 92 at % of Si, about 4 at % to about 32 at % of Fe, and about 0.3 at % to about 6.0 at % of $M_1$; rapidly cooling and solidifying the melt of the mother alloy to obtain a rapidly cooled and solidified alloy; and pulverizing the rapidly cooled and solidified alloy to prepare a silicon-based alloy, but embodiments are not limited thereto.

The preparing of the mother alloy may be performed by vacuum induction melting (VIM), arc melting, and/or mechanical alloying. In some embodiments, the preparing of the mother alloy may be performed by using vacuum induction melting that melts the mother alloy in a vacuum condition to minimize or reduce oxidation of the alloy caused by the air. However, the method of preparing the mother alloy is not limited thereto, and any suitable method of preparing a mother alloy available in the art may be used.

Raw materials for preparing the silicon-based alloy are not limited as long as the raw materials may satisfy a ratio of the suitable or necessary composition. For example, in order to mix elements constituting the silicon-based alloy into the suitable or desired composition ratio, elements, alloys, solid solutions, or intermetallic compounds may be used.

For example, a metal powder of each element may be measured to satisfy the suitable or desired alloy composition ratio, and the metal powders may be mixed to prepare the mother alloy of the silicon-based alloy by using a vacuum induction furnace. The vacuum induction furnace is equipment that may melt a metal having a high melting point by using high frequency induction. In the beginning stage of the melting process, an inside of the vacuum induction melting furnace may be evacuated to vacuum, and an inert gas, such as Ar, may be injected into the vacuum induction melting furnace to prevent or reduce oxidation of the mother alloy thus prepared.

Next, the mother alloy thus prepared is melted, and then the melt is rapidly cooled and solidified. The rapid cooling and solidifying process is not particularly limited but may be performed by, for example, melt spinning, gas atomize, or strip cast. Through the rapid cooling and solidifying process, an alloy including silicon nanoparticles evenly dispersed in a matrix may be prepared.

The rapid cooling and solidifying process may be performed by melt spinning. For example, the rapid cooling and solidifying may be performed by injecting the melt of the mother alloy to a wheel that rotates at a high speed by a melt spinner using high frequency induction. Here, the rapid cooling and solidifying process may include a rapid cooling process of the melt of the mother alloy at a rate in a range of about $10^3$ K/sec to about $10^7$ K/sec.

The melt of the mother alloy is cooled by the wheel that rotates at a high speed and thus is injected in the shape of ribbon, and a size of silicon nanoparticles distributed in the shape of ribbon in the alloy is determined by a cooling rate. In order to obtain fine silicon nanoparticles, for example, the melt may be cooled at a rate of about 1000° C./s or higher. Also, in order to obtain homogeneous silicon nanoparticles, a thickness of the ribbon-shaped injection molded product may be controlled to be in a range of about 5 μm to about 20 μm, or, for example, about 7 μm to about 16 μm.

The rapidly cooled and solidified alloy, which is an alloy injection molded product in the shape of ribbon as prepared by rapid cooling and solidifying may be pulverized into a powder and may be used as a negative active material. A D50 of the pulverized alloy powder may be in a range of about 1 μm to about 5 μm. The pulverization may be performed by using any suitable pulverization method available in the art. For example, a device for the pulverization may be an atomizer, a vacuum mill, a ball mill, a planetary ball, a beads mill, and/or a jet mill, but embodiments are not limited thereto. The pulverization may be performed for about 6 hours to about 48 hours.

The pulverization method may be classified into a dry pulverization method and a wet pulverization method, and either pulverization method may be used.

According to an aspect of an exemplary embodiment, a negative electrode includes the negative active material.

According to an aspect of an exemplary embodiment, a lithium battery includes the negative electrode. For example, the lithium battery may include a negative electrode including the negative active material; a positive electrode disposed facing the negative electrode; and an electrolyte disposed between the negative electrode and the positive electrode.

The negative electrode and the lithium battery including the negative electrode may be prepared as follows.

The negative electrode includes the negative active material. For example, the negative electrode may be manufactured by preparing a negative active material composition by mixing the negative active material, a conducting agent, and a binder in a solvent; and molding the negative active material composition in a set (or predetermined) shape or coating the negative active material composition on a current collector such as a copper foil.

The binder included in the negative active material composition contributes in binding of the negative active material and the conducting agent and binding of the negative active material to the current collector, and an amount of the binder may be in a range of about 1 part to about 50 parts by weight based on 100 parts by weight of the negative active material. For example, an amount of the binder may be in a range of about 1 part to about 30 parts by weight, for example, about 1 part to about 20 parts by weight, or about 1 part to about 15 parts by weight, based on 100 parts by weight of the negative active material. Examples of the binder may include various suitable polymers such as polyvinylidene fluoride (PVdF), polyvinylidene chloride, polybenzimidazole, polyimide, polyvinyl acetate, polyacrylonitrile, polyvinyl alcohol, carboxymethylcellulose (CMC), starch, hydroxypropylcellulose, reproduced cellulose, polyvinylpyrrolidone, tetrafluoroethylene, polyethylene, polypropylene, polystyrene, polymethyl methacrylate, polyaniline, acrylonitrile butadiene styrene, phenol resin, epoxy resin, polyethylene terephthalate, polytetrafluoroethylene, polyphenyl sulfide, polyamideimide, polyetherimide, polyethylene sulfone, polyamide, polyacetal, polyphenylene oxide, polybutylene terephthalate, ethylene-propylene-diene monomer (EPDM), sulfonated EPDM, styrene butadiene rubber (SBR), fluorine rubber, or a combination thereof, but embodiments are not limited thereto.

The conducting agent included in the negative active material composition may increase an electrical conductivity by providing a conduction pathway to the positive active material. The conducing agent may be any suitable conducting material generally used in a lithium battery. Examples of the conducting agent may include a carbonaceous material such as carbon black, acetylene black, ketjen black, or carbon fiber (e.g., vapor growth carbon fiber); a metal-based material such as a metal powder or metal fiber of copper, nickel, aluminum, or silver; a conductive polymer such as a polyphenylene derivative; or a conducting material including a mixture thereof. An amount of the conducting agent may be suitably or appropriately controlled. For example, a weight ratio of the negative active material and the conducting agent may be in a range of about 99:1 to about 90:10.

Examples of the solvent may include N-methylpyrrolidone (NMP), acetone, and water. An amount of the solvent may be in a range of about 1 part to about 10 parts by weight based on 100 parts by weight of the negative active material. When the amount of the solvent is within this range, an active material layer may be easily formed.

Also, a thickness of the current collector may be in a range of about 3 µm to about 500 µm, and may be any of various suitable current collectors that do not cause an undesirable or unsuitable chemical change to a battery and has high conductivity. Examples of the current collector for a negative electrode may include stainless steel, aluminum, nickel, titanium, calcined carbon, and copper and stainless steel that are surface-treated with carbon, nickel, titanium, or silver. The current collector for a negative electrode may have an uneven micro structure at its surface to enhance a binding force with the negative active material. Also, the current collector may be used in various suitable forms including a film, a sheet, a foil, a net, a porous body, a foaming body, or a non-woven body.

The negative active material composition may be directly coated on a current collector, or the negative active material composition may be cast on a separate support to form a negative active material film, which may then be separated from the support and laminated on a copper foil current collector to prepare a negative electrode plate, but embodiments to prepare the negative electrode are not limited thereto.

The negative active material composition may be printed on a flexible electrode substrate to manufacture a printable battery, in addition to the use in manufacturing a lithium battery.

Separately, for the manufacture of a positive electrode, a positive active material composition is prepared by mixing a positive active material, a conducting agent, a binder, and a solvent.

The positive active material may be any suitable positive active material that is represented by any one of $Li_aA_{1-b}B_bD_2$ (where, $0.90 \leq a \leq 1.8$ and $0 \leq b \leq 0.5$); $Li_aE_{1-b}B_bO_{2-c}D_c$ (where, $0.90 \leq a \leq 1.8$, $0 \leq b \leq 0.5$, and $0 \leq c \leq 0.05$); $LiE_{2-b}B_bO_{4-c}D_c$ (where, $0 \leq b \leq 0.5$ and $0 \leq c \leq 0.05$); $Li_aNi_{1-b-c}Co_bB_cD_\alpha$ (where, $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (where, $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_2$ (where, $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (where, $0.90 \leq a \leq 1.8$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (where, $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_2$ (where, $0.90 \leq a \leq 1.8$, $0 \leq b \leq 0.5$, $0 \leq c \leq 0.05$, and $0 < \alpha < 2$); $Li_aNi_bE_cG_dO_2$ (where, $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (where, $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where, $0.90 \leq a \leq 1.8$ and $0.001 \leq b \leq 0.1$); $Li_aCoG_bO_2$ (where, $0.90 \leq a \leq 1.8$ and $0.001 \leq b \leq 0.1$); $Li_aMnG_bO_2$ (where, $0.90 \leq a \leq 1.8$ and $0.001 \leq b \leq 0.1$); $Li_aMn_2G_bO_4$ (where, $0.90 \leq a \leq 1.8$ and $0.001 \leq b \leq 0.1$); $QO_2$; $V_2O_5$; $LiV_2O_5$; $LiIO_2$; $LiNiVO_4$; $Li_{(3-f)}J_2(PO_4)_3$ (where, $0 \leq f \leq 2$); $Li_{(3-f)}Fe_2(PO_4)_3$ (where, $0 \leq f \leq 2$); and $LiFePO_4$.

In the formulae above, A is Ni, Co, Mn, or a combination thereof; B is Al, Ni, Co, Mn, Cr, Fe, Mg, Sr, V, a rare-earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

For example, the positive active material may be $LiCoO_2$, $LiMn_xO_{2x}$, (where, x is 1 or 2), $LiNi_{1-x}Mn_xO_{2x}$, (where, $0 < x < 1$), $LiNi_{1-x-y}Co_xMn_yO_2$ (where, $0 \leq x \leq 0.5$ and $0 \leq y \leq 0.5$), or $FePO_4$.

The conductive agent, the binder, and the solvent included in preparing the positive active material composition may be the same (or substantially the same) with those included in the negative active material composition. In some cases, a plasticizer may be further added to the positive active material composition and to the negative active material composition in order to form pores in a corresponding electrode plate. Amounts of the positive active material, the conducting agent, the binder, and the solvent may be at the same levels generally used in the art for lithium batteries.

A positive electrode current collector may have a thickness of about 3 μm to about 500 μm, and may be any of various suitable current collectors that do not cause an undesirable or unsuitable chemical change to a battery and has high conductivity. Examples of the current collector for a positive electrode may include stainless steel, aluminum, nickel, titanium, calcined carbon, and aluminum and stainless steel that are surface-treated with carbon, nickel, titanium, or silver. The current collector for a positive electrode may have an uneven micro structure at its surface to enhance a binding force with the positive active material. Also, the current collector may be used in various suitable forms including a film, a sheet, a foil, a net, a porous body, a foaming body, or a non-woven body.

The positive active material thus prepared may be directly coated on the current collector for a positive electrode to form a positive electrode plate, or may be case onto a separate support and a positive active material film separated from the support is laminated on the current collector for a positive electrode.

The positive electrode and the negative electrode may be separated by a separator, and the separator may be any of various suitable separators that are generally used in a lithium battery. For example, the separator may include a material that has a low resistance to migration of ions of an electrolyte and an excellent electrolytic solution-retaining capability. For example, the separator may include a material selected from glass fiber, polyester, Teflon, polyethylene, polypropylene, polytetrafluoroethylene (PTFE), and a combination thereof, each of which may be non-woven or woven. The separator may have a pore diameter in a range of about 0.01 μm to about 10 μm, and a thickness in a range of about 5 μm to about 300 μm.

A lithium salt-containing non-aqueous based electrolyte solution includes a non-aqueous electrolyte and a lithium salt. Examples of the non-aqueous electrolyte may include a non-aqueous electrolyte solution, a solid electrolyte, and an inorganic solid electrolyte.

The non-aqueous electrolyte solution may be an aprotic organic solvent, and examples of the aprotic organic solvent may include N-methyl-2-pyrrolidone, propylene carbonate, ethylene carbonate, butylene carbonate, dimethyl carbonate, diethyl carbonate, gamma-butyrolactone, 1,2-dimethoxy ethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte may include polyethylene derivatives, polyethylene oxide derivatives, polypropylene oxide derivatives, phosphoric acid ester polymers, polyester sulfide, polyvinyl alcohols, polyvinylidene fluoride, and polymers containing ionic dissociation groups.

Examples of the inorganic solid electrolyte may include nitrides, halides, and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt may be any suitable lithium salt that is used in the art of lithium batteries, and that it is soluble in the lithium salt-containing non-aqueous electrolyte. For example, the lithium salt may include at least one selected from $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenyl borate, and lithium imide.

Lithium batteries may be classified as lithium ion batteries, lithium ion polymer batteries, and lithium polymer batteries according to the types (or kinds) of a separator and an electrolyte used therein. In addition, lithium batteries may be classified as a cylindrical type (or kind), a rectangular type (or kind), a coin type (or kind), and a pouch type (or kind) according to a battery shape, and may also be classified as a bulk type (or kind) and/or a thin type (or kind) according to a battery size. Lithium batteries may be also used either as primary lithium batteries or secondary lithium batteries.

Any suitable method of manufacturing a lithium battery available in the art may be utilized, and thus detailed description thereof is not necessary here.

Figure 5:
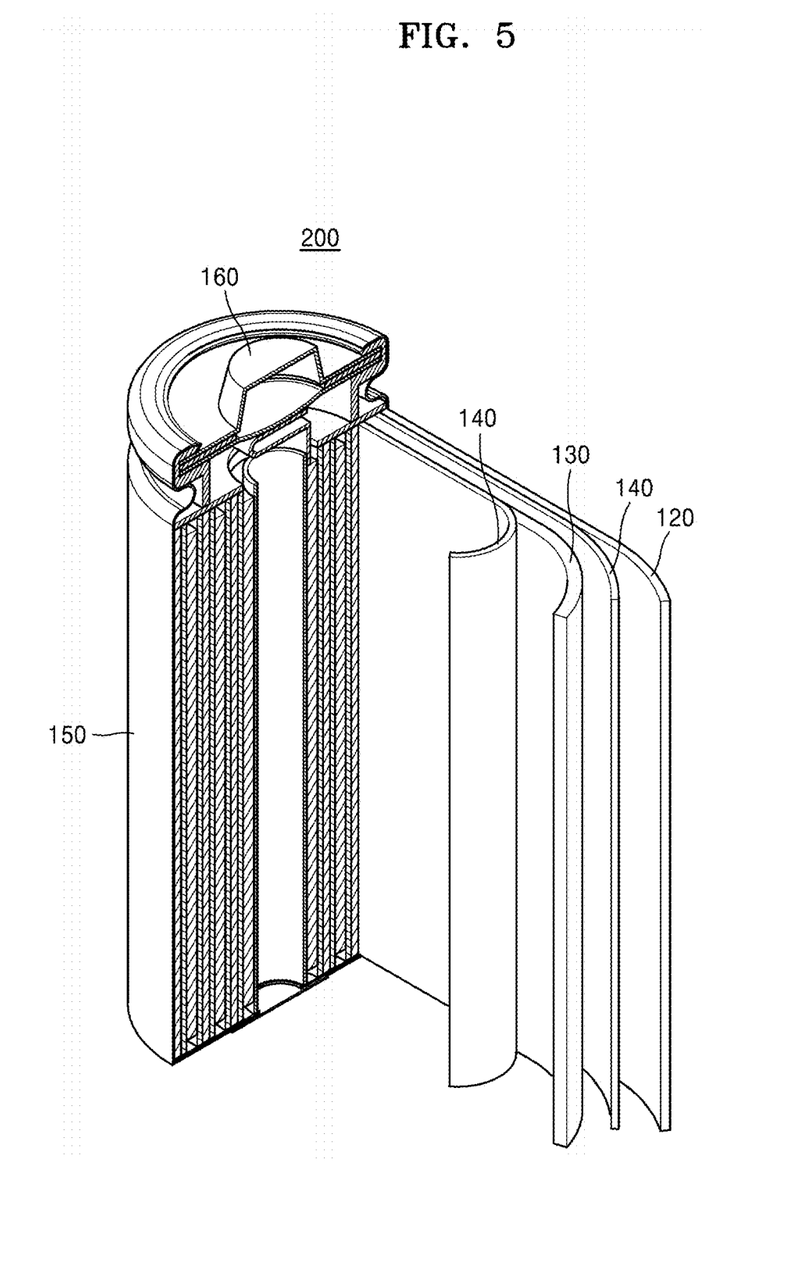
FIG. 5 is a schematic view of a structure of a lithium battery according to an exemplary embodiment.

FIG. 5 schematically illustrates a structure of a lithium battery 200 according to an exemplary embodiment.

Referring to FIG. 5, the lithium battery 200 includes a positive electrode 130, a negative electrode 120, and a separator 140 disposed between the positive electrode 130 and the negative electrode 120. The positive electrode 130, the negative electrode 120, and the separator 140 are wound or folded, and then accommodated in a battery case 150. Subsequently, an electrolyte is injected into the battery case 150, and the battery case 150 is sealed by a sealing member 160, thereby completing the manufacture of the lithium battery 200. The battery case 150 may have a cylindrical shape, a rectangular shape, or a thin-film shape. The lithium battery 200 may be a lithium ion battery.

The lithium secondary battery may be a wound type (or kind) or a stack type (or kind) according to a type (or kind) of an electrode, or may be a cylindrical type (or kind), a rectangular type (or kind), a coin type (or kind), and a pouch type (or kind) according to a type (or kind) of an external material.

The lithium battery may be suitable to be used as a battery, as power sources, of small-sized devices such as mobile phones or portable computers, or as a unit battery of a battery module including a plurality of batteries in a medium-to-large-sized device.

Examples of the medium-to-large-sized device may include a power tool; an xEV such as electric vehicle (EV), hybrid electric vehicle (HEV), and plug-in hybrid electric vehicle (PHEV); electric bicycles such as E-bike or E-scooter; an electric golf cart; an electric truck; an electric commercial vehicle; or an electric power storage system, but embodiments are not limited thereto. Also, the lithium battery may be suitable for use requiring a high output, a high voltage, and high temperature operability.

One or more embodiments will now be described in more detail with reference to the following examples. However, these examples are not intended to limit the scope of the one or more embodiments.

Example 1

Preparation of Lithium Secondary Battery
Preparation of Negative Electrode

First, Si, Fe, and Mn were mixed to a ratio of 80.2 at %, 17.9 at % and 1.9 at %, respectively, to provide a mixture, and the mixture was then inserted into a vacuum induction melting furnace (available from Yein Tech., Korea), in which the mixture was melted under vacuum atmosphere to inhibit or reduce oxidation caused by atmospheric air, to prepare a mother alloy.

The prepared mother alloy was pulverized into large lumps, which were inserted into a melt spinner (available from Yein Tech., Korea). The large lumps were then subjected to a high-frequency induction heating under argon gas atmosphere to melt-mix the mother alloy, and the melt-mixed mother alloy was sprayed onto a revolving Cu wheel through a nozzle to inject the alloy in a ribbon shape, which was then rapidly solidified as a ribbon.

The prepared alloy ribbon was pulverized using a ball mill for 24 hours to obtain a silicon-based alloy, and this was used as a negative active material.

The prepared negative active material, polyimide (PI) as a binder, and a carbon conducting agent (denka black) as a conducting agent were mixed to a weight ratio of 80:10:10, respectively, and then N-methylpyrrolidone as a solvent was added to the mixture to adjust the viscosity such that a solid content in the solution was 60 wt %. Thus, a negative active material composition was prepared.

The negative active material composition thus prepared was coated on a copper foil current collector having a thickness of 15 μm at a thickness of about 40 μm. The current collector coated with the composition was dried at room temperature, dried again at a temperature of 120° C., and pressed and punched to prepare a negative electrode for a coin cell having a 18650 standard.

Preparation of Positive Electrode $LiNi_{1/3}Co_{1/3}Mn_{1/3}O_2$ as a positive active material, polyvinylidene fluoride (PVDF) as a binder, and a carbon conducting agent (Denka Black) as a conducting agent were mixed to a weight ratio of 90:5:5, respectively, and then N-methylpyrrolidone as a solvent was added to the mixture to adjust the viscosity such that a solid content in the solution was 60 wt %. Thus, a positive active material composition was prepared.

The positive active material composition thus prepared was coated on an aluminum foil current collector having a thickness of 15 μm at a thickness of about 40 μm. The current collector coated with the composition was dried at room temperature, dried again at a temperature of 120° C., and pressed and punched to prepare a positive electrode for a coin cell having a 18650 standard.

Preparation of Lithium Secondary Battery (Full Cell)

The negative electrode, the positive electrode, and a polypropylene separator having a thickness of about 14 μm disposed between the positive electrode and the negative electrode were used, and an electrolyte was injected thereto, to prepare a compressed coin cell having a 18650 standard. Here, the electrolyte included $LiPF_6$ dissolved in a solvent mixture of ethylene carbonate (EC), diethyl carbonate (DEC), and fluoroethylene carbonate (FEC) to a volume ratio of 5:70:25, respectively, to provide a $LiPF_6$ concentration of 1.10 M.

Comparative Example 1

A lithium secondary battery was prepared in the same manner as described with respect to Example 1, except that a silicon-based alloy derived from a mother alloy prepared by mixing 81.2 at % of Si, 18.6 at % of Fe, and 0.2 at % of Mn was used as a negative active material.

Comparative Example 2

A lithium secondary battery was prepared in the same manner as described with respect to Example 1, except that a silicon-based alloy derived from a mother alloy prepared by mixing 80.9 at % of Si, 17.0 at % of Fe, and 2.1 at % of Al was used as a negative active material.

Comparative Example 3

A lithium secondary battery was prepared in the same manner as described with respect to Example 1, except that a silicon-based alloy derived from a mother alloy prepared by mixing 78.3 at % of Si, 15.6 at % of Fe, and 6.1 at % of Mn was used as a negative active material.

Evaluation Example 1: X-ray Diffraction (XRD) Analysis of Negative Active Material XRD analysis using Cu—Kα of 1.5406 Å (D8 focus, available from Bruker) was performed on the negative active materials prepared in Example 1 and Comparative Examples 1 to 3, and the results are shown in FIG. 6.

Figure 6:
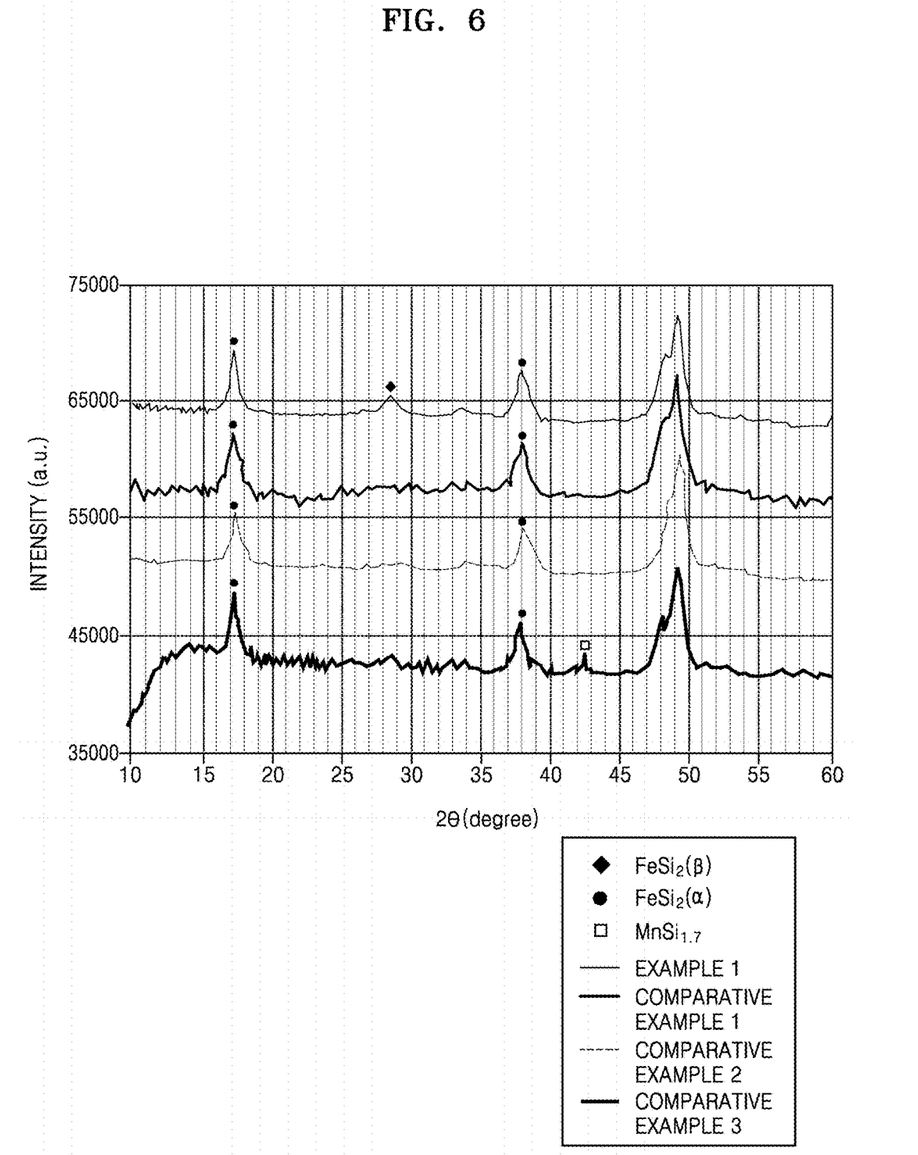
FIG. 6 is a graph illustrating an X-ray diffraction analysis (using Cu—Kα of 1.5406 Å) spectrum of negative active materials prepared in Example 1 and Comparative Examples 1 to 3.

As shown in FIG. 6, the negative active material prepared in Example 1 has a peak generated by the $FeSi_2$ alpha phase and a peak generated by the $FeSi_2$ beta phase. Also, the silicon-based alloy of Example 1 contains 1.9 at % of Mn but did not have a peak generated by $MnSi_{1.7}$ or other phases, and thus, it may be seen that Mn in the silicon-based alloy of Example 1 is doped into a crystalline lattice of the Si single phase, the $FeSi_2$ alpha phase, or the $FeSi_2$ beta phase. The diffraction peak within (e.g., at) a diffraction angle 2θ in a range of about 47.0° to about 49.5° shown in FIG. 6 is the peak generated by the $FeSi_2$ alpha phase and the peak generated by the $FeSi_2$ beta phase that are overlapped with each other.

However, the silicon-based alloy containing 0.2 at % of Mn as a negative active material in Comparative Example 1, the silicon-based alloy containing 2.1 at % of Al as a negative active material in Comparative Example 2, and the silicon-based alloy containing 6.1 at % of Mn as a negative active material in Comparative Example 3 did not have a peak generated by the $FeSi_2$ beta phase. Thus, it may be confirmed that the negative active material including Mn and the negative active material including Al at less or more than a set (or predetermined) amount may not contribute in formation of the $FeSi_2$ beta phase.

Further, the negative active material of Comparative Example 3 has a peak generated by an $MnSi_{1.7}$ phase, and thus when Mn is included at more than a set (or predetermined) amount, it may be confirmed that Mn does not exist in the silicon-based alloy as in the doped state but forms another compound with Si.

Figure 7:
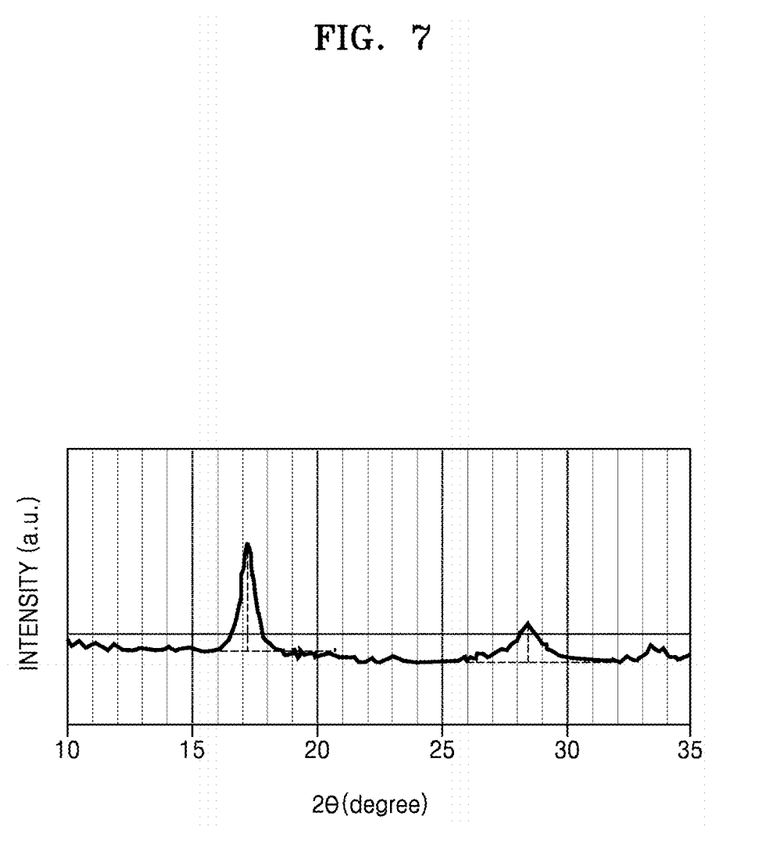
FIG. 7 is a partially enlarged view of the graph of FIG. 6 illustrating the X-ray diffraction analysis (using Cu—Kα of 1.5406 Å) spectrum of the negative active material prepared in Example 1 to measure an intensity ratio of a diffraction peak generated by a $FeSi_2$ beta phase to a diffraction peak generated by a $FeSi_2$ alpha phase.

Also, an intensity ratio of the second peak to the first peak of the negative active material prepared in Example 1 was calculated and shown in and Table 1. The second peak and the first peak of the negative active material prepared according to Example 1 can be seen in the graph of FIG. 7.

TABLE 1

| | Composition ratio (at %) | | | Existence of $FeSi_2$ beta phase | Second peak/first peak |
|---|---|---|---|---|---|
| | Si | Fe | Mn | | |
| Example 1 | 80.2 | 17.9 | 1.9 | ○ | 0.35 |
| Comparative Example 1 | 81.2 | 18.6 | 0.2 | X | — |
| Comparative Example 2 | 80.9 | 17.0 | Al 2.1, instead of Mn | X | — |

TABLE 1-continued

| | Composition ratio (at %) | | | Existence of FeSi$_2$ beta phase | Second peak/first peak |
|---|---|---|---|---|---|
| | Si | Fe | Mn | | |
| Comparative Example 3 | 78.3 | 15.6 | 6.1 | X | — |

Evaluation Example 2: Lifespan Characteristics Evaluation of Lithium Battery

Lithium batteries prepared in Example 1 and Comparative Examples 1 to 3 were charged at a constant current of 0.1 C rate until a voltage reached about 4.2 V (vs. Li), and the current was cut-off at a constant current of 0.01 C while maintaining a constant voltage mode at 4.2 V at a temperature of 25° C. Then, the battery was discharged at a constant current of 1.0 C rate until a voltage reached about 2.5 V (vs. Li) to complete one cycle, and the cycle was repeated 100 times.

An interval time period after every charging/discharging cycle was 10 minutes.

Figure 8:
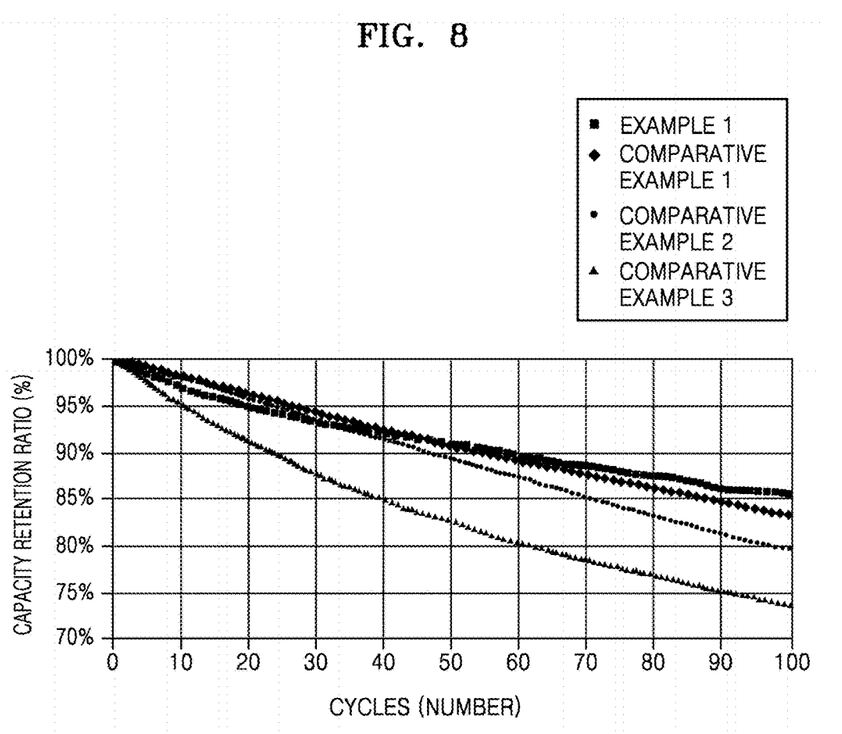
FIG. 8 is a graph illustrating a capacity retention ratio per cycle of lithium secondary batteries prepared in Example 1 and Comparative Examples 1 to 3.

The results of the charging/discharging test are shown in FIG. 8. Here, a capacity retention ratio (CRR) is defined by Equation 1 below:

Capacity retention ratio [%]=[Discharge capacity at each cycle/Discharge capacity at 1$^{st}$ cycle]×100   Equation 1

As shown in FIG. 8, lifespan characteristics of the lithium battery of Example 1 improved compared to lifespan characteristics of the lithium batteries of Comparative Examples 1 to 3. Thus, it may be confirmed that the existence of the FeSi$_2$ beta phase in the silicon-based alloy at a set (or predetermined) amount contributed improvement in cycle characteristics of the lithium battery.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," another element or layer, it can be directly on the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While one or more exemplary embodiments have been described with reference to the figures, it will be understood by those of ordinary skill in the art that various changes in form and details may be made therein without departing from the spirit and scope as defined by the following claims, and equivalents thereof.

What is claimed is:
1. A negative active material comprising:
a silicon-based alloy,
wherein the silicon-based alloy is represented by Si—Fe—M$_1$,
M$_1$ is at least one selected from lithium (Li), magnesium (Mg), calcium (Ca), titanium (Ti), vanadium (V), chromium (Cr), manganese (Mn), cobalt (Co), nickel (Ni), copper (Cu), zinc (Zn), yttrium (Y), zirconium (Zr), molybdenum (Mo), indium (In), tin (Sn), boron (B), carbon (C), oxygen (O), and phosphorous (P),
the silicon-based alloy comprises a Si single phase, a FeSi$_2$ alpha phase, and a FeSi$_2$ beta phase,
the Si single phase comprises Si active nanoparticles having an average particle diameter (D50) in a range of 10 nm to 100 nm,
a Cu-Kα X-ray diffraction analysis spectrum of the negative active material has a first diffraction peak generated by the FeSi$_2$ alpha phase at a diffraction angle 2θ of 17.0°+/−0.5° and a second diffraction peak generated by the FeSi$_2$ beta phase at a diffraction angle 2θ of 28.7°+/−0.5°, and an intensity ratio of the second diffraction peak, generated by the FeSi$_2$ beta phase, to the first diffraction peak, generated by the FeSi$_2$ alpha phase, is 0.1 or higher to less than 1.0, wherein the FeSi$_2$ alpha phase and the FeSi$_2$ beta phase form an interface with the Si single phase and serve as a matrix that surrounds the Si single phase, and wherein, in the silicon-based alloy, an amount of M$_1$ is in a range of 2.9 at % to 6 at %, based on the total number of atoms of Si, Fe, and M$_1$.

2. The negative active material of claim 1, wherein an intensity ratio of the second diffraction peak to the first diffraction peak is in a range of 0.2 to less than 1.0.

3. The negative active material of claim 1, wherein M$_1$ is at least one selected from titanium (Ti), vanadium (V), chromium (Cr), manganese (Mn), cobalt (Co), nickel (Ni), copper (Cu), and zinc (Zn).

4. The negative active material of claim 1, wherein, in the silicon-based alloy, an amount of Si is in a range of 67 at % to 92 at %, and an amount of Fe is in a range of 4 at % to 32 at %, based on the total number of atoms of Si, Fe, and M$_1$.

5. The negative active material of claim 1, wherein, in the silicon-based alloy, an amount of Si is in a range of 75 at % to 90 at %, and an amount of Fe is in a range of 9 at % to 22 at %, based on the total number of atoms of Si, Fe, and M$_1$.

6. The negative active material of claim 1, wherein, in the silicon-based alloy, M$_1$ is doped into a crystal lattice of at least one selected from the Si single phase, the FeSi$_2$ alpha phase, and the FeSi$_2$ beta phase.

7. The negative active material of claim 1, wherein, the silicon-based alloy does not include an M$_1$-containing silicide.

8. The negative active material of claim 1, wherein, the silicon-based alloy is represented by Si—Fe—Mn, and, in the silicon-based alloy, an amount of Si is in a range of 75 at % to 90 at %, and an amount of Fe is in a range of 9 at % to 22 at %, based on the total number of atoms of Si, Fe, and Mn.

9. The negative active material of claim 1, wherein the silicon-based alloy comprises Si$_{83.9}$Fe$_{13.2}$Mn$_{2.9}$.

10. The negative active material of claim 9, wherein the silicon-based alloy does not include an Mn-containing silicide.

11. The negative active material of claim 10, wherein the Mn-containing silicide is MnSi$_{1.7}$.

12. The negative active material of claim 1, wherein an average particle diameter (D50) of the silicon-based alloy is in a range of 1 μm to 5 μm.

13. A negative electrode for a lithium battery, the negative electrode comprising the negative active material of claim 1.

14. A lithium battery comprising the negative electrode of claim 13.

15. The negative active material of claim 1, wherein an amount of the FeSi$_2$ beta phase is greater than an amount of the FeSi$_2$ alpha phase in the silicon-based alloy.

* * * * *